Patented May 15, 1951

2,553,524

UNITED STATES PATENT OFFICE 2,553,524

REACTION OF AMINOTRIAZINE-ALDEHYDE WITH VINYL ACETATE-MALEIC COPOLYMER

Massimo Baer, Springfield, Mass., assignor to Monsanto Chemical Company, St. Louis, Mo., a corporation of Delaware No Drawing. Application December 20, 1947, Serial No. 793,053

7 Claims. (Cl. 260—45.2)

This invention relates to water-insoluble polymeric materials. More particularly, this invention relates to infusible, insoluble polymeric materials prepared from normally fusible, soluble copolymers of vinyl acetate and maleic acid or anhydride.

Copolymers of vinyl acetate and maleic acid or anhydride have been found to be normally fusible and soluble. While this characteristic is useful for certain purposes, for other purposes it restricts the usefulness of these materials.

It is an object of this invention to prepare infusible, insoluble products from normally fusible, soluble copolymers of vinyl acetate and maleic acid or anhydride.

These and other objects are accomplished according to the present invention by incorporating 2-15 parts by weight of an aminotriazine-aldehyde condensation product in 100 parts by weight of a normally fusible, soluble copolymer of vinyl acetate and maleic acid or anhydride and then heating the resulting composition to produce an infusible, insoluble product.

The following examples are illustrative of the present invention, but are not to be considered as limitative thereof. Where parts are mentioned, they are parts by weight.

Example I 100 parts of a high molecular weight heteropolymer prepared by copolymerizing vinyl acetate and maleic anhydride in about equimolecular proportions, is dissolved in water by means of heat to form a 15% solution. After cooling the solution, a 10% aqueous solution of 5 parts dimethylol melamine is added and thoroughly mixed therewith. The resulting clear solution is cast in the form of a film on glass, and the coated glass is then heated for about 15 minutes at 120-150° C., whereupon the film becomes infusible and completely water-insoluble. The resulting film is transparent, hard and heat stable.

Example II

A 15% solution of 100 parts of the same heteropolymer as is used in Example I is prepared by dissolving the heteropolymer in acetone. To the resulting solution are added 100 parts of a 10% solution of the butyl ether of dimethylol melamine in acetone. After thoroughly mixing the two solutions, the resulting homogeneous solution is cast on a glass plate in the form of a thin film. On heating at 120-150° C. for a few minutes, a tough, transparent, colorless, infusible, insoluble film is obtained.

Example III 100 parts of the same heteropolymer as is used in Example I is dissolved in water to form a 10% solution. To the resulting solution are added 5 parts of methylated tetramethylol melamine in the form of a 10% aqueous solution and thoroughly mixed therewith. The clear, homogeneous solution which results is applied in the form of a film on a steel plate, and the coated plate heated for 20 minutes in a 125° C. oven whereupon the film is converted to an infusible, insoluble, transparent, colorless coating.

In contrast to the products of the examples, if the heteropolymer of vinyl acetate and maleic anhydride is subjected to the same treatment in the absence of the aminotriazine-aldehyde condensation product, the heteropolymer remains fusible and soluble.

As can be seen from the results set forth in the examples, it is unexpectedly discovered according to this invention that heteropolymers of vinyl acetate and maleic acid or anhydride can be readily rendered infusible and insoluble on heating in the presence of small amounts of melamine-formaldehyde condensation products. In view of the dissimilar nature of these two materials, it is surprising that this should be the case.

The temperature used for rendering the compositions of the invention infusible and insoluble may vary substantially. Usually, the compositions thermoset in a few minutes, i. e. 5-20 minutes at 100-150° C. and this temperature is generally found to be the most useful. However, lower temperatures, for example, as low as 40° C. or higher temperatures, for example, up to 200° C., may be desirable for certain purposes.

Among the numerous advantages of the compositions of the invention is the fact that clear, aqueous solutions thereof may be prepared, particularly when the aminotriazine-aldehyde condensation product is a methylol melamine, or a methylated methylol melamine and the heteropolymer does not contain over 1.5-2.0 mols of vinyl acetate for every mol of maleic acid or anhydride. The convenience and economic advantages residing in the use of water as the solvent are readily apparent.

Other solvents may be used when desired or necessary, e. g., acetone, methanol, ethanol, etc., the particular solvent depending on the solubility of the components.

Instead of admixing solutions of the two components of the compositions of the invention, the ingredients may be admixed in the absence of solvents, e. g., on mixing rolls, or in a dough-type mixer. After imparting the desired shape to the resulting composition, it may be converted into the infusible, insoluble state by the application of heat.

The heteropolymers of vinyl acetate and maleic acid or anhydride used in the process of the invention may be made by usual methods for polymerizing unsaturated compounds, e. g., in solution, in mass, or in a liquid which is a solvent for the monomeric materials, but not for the heteropolymer. Illustrative examples are set forth in my copending patent application Ser. No. 691,412, filed August 17, 1946, now Patent No. 2,476,474, July 19, 1949. A particularly preferred procedure is set forth in my copending application, Ser. No. 790,221, filed December 6, 1947, whereby especially high molecular weight products are obtained by polymerization in the presence of a small amount of a material which is a solvent for the monomeric materials, but not for the heteropolymer.

Usually maleic anhydride is preferred over maleic acid as the copolymerizing material in view of the faster polymerization rates which result and greater solubility of maleic anhydride. Since on solution of the vinyl acetate-maleic anhydride heteropolymer in water, the anhydride groups hydrolyze to carboxyl groups, there is no disadvantage in using this heteropolymer.

In preparing the heteropolymers in the presence of a solvent for the monomers which is a non-solvent for the polymer, such liquids may be used as benzene, toluene, xylene, chlorobenzene, chlorotoluene, chloroxylene, dichloroethylene, trichloroethylene and the corresponding bromo and fluoro compounds.

Various molar ratios of vinyl acetate to maleic acid or anhydride may be employed in preparing the heteropolymers, e. g., from 1:9 to 9:1. Usually it is preferred that the ratio of maleic acid or anhydride to vinyl acetate does not exceed 1:1 since the use of an excess of maleic acid or anhydride per se may be undesirable in some cases. However, it is frequently desirable that the ratio of vinyl acetate to anhydride exceed 1:1, for example, the ratio may be as high as 9:1 as pointed out above.

Heteropolymers of vinyl acetate and maleic acid or anhydride possess a substantial solubility in water without the use of compounds forming salts therewith. Usually, the aqueous solutions thereof are clear. However, the products resulting from polymerizing mixtures of vinyl acetate and maleic acid or anhydride containing a substantial molar excess of vinyl acetate, i. e., more than 1.5–2.0 mols of vinyl acetate for every mol of maleic acid or anhydride, tend to form hazy aqueous solutions. While these polymers may be used in accordance with the invention, when aqueous solutions are employed, it is preferred to use the heteropolymers which form clear aqueous solutions without the addition of salt-forming materials.

The aminotriazine-aldehyde reaction products employed according to this invention may comprise aminotriazine-aldehyde addition products or condensation products of these addition products or ether derivatives of the foregoing. Melamine formaldehyde reaction products, for example, may be prepared by reacting formaldehyde and melamine in the proper molecular proportions, preferably under alkaline conditions. Melamine formaldehyde addition products comprise methylol derivatives of melamine or mixtures thereof. Thus, mono-, di-, tri-, tetra-, penta-, and hexamethylol melamines or mixtures thereof may be prepared. Excessive condensation of the methylol compounds is to be avoided, i. e., formation of infusible, insoluble condensation products.

Etherified melamine formaldehyde reaction products may be prepared by reacting melamine, formaldehyde and an alcohol, preferably a monohydric alcohol, as is well known to those skilled in the art. According to one embodiment of this invention, the ethers which are used are prepared by reacting the melamine formaldehyde reaction products described above with a monohydric alcohol.

Included within the scope of this invention are various methylol melamine ethers. According to one embodiment of this invention, the ethers employed are alkyl ethers of di-, tri-, tetra-, penta- and hexamethylol melamine, or mixtures thereof, in which the alkyl radical contains less than 7 carbon atoms.

Examples of such ethers are methylated, propylated, butylated and hexylated di-, tri-, tetra-, penta- and hexamethylol melamines, respectively. A particular embodiment of this invention comprises the use of the ethers of tri-, tetra-, penta- and hexamethylol melamine or mixtures thereof.

Included within the scope of this invention are ethers of aminotriazine-aldehyde reaction products in which the residue of the alcohols or other substances employed in preparing the ethers vary widely in their chemical structures. Thus, the residues may comprise aliphatic, aromatic, aliphatic-aromatic, aromatic-aliphatic, hydro-aromatic and heterocyclic radicals. As examples of such radicals may be mentioned methyl, ethyl, propyl, butyl, amyl, phenyl, benzyl, toluyl, lauryl, cetyl, allyl, stearyl, oleyl, furfuryl, cyclohexyl and the like. When the ethers are made from alcohols, monohydric or polyhydric alcohols or mixtures thereof may be employed, although monohydric alcohols are preferred. Examples of such alcohols are methyl alcohol, ethyl alcohol, propyl alcohol, butyl alcohol, ethyl butanol, ethyl hexanol, lauryl alcohol, stearyl alcohol, benzyl alcohol, ethylene glycol, diethylene glycol, glycerol, sorbitol, terpineol, furfuryl alcohol and the like.

A preferred group of ethers comprises alkyl ethers of methylol melamine, particularly those in which the alkyl group is one containing less than 7 carbon atoms. When desired, the alkyl groups may be substituted, for example, with halogen atoms. Examples of such substituted groups are mono-, di-, and trichloro-ethyl, -propyl, -butyl, and -amyl radicals.

Included within the scope of this invention are other aldehyde-reactable aminotriazines than melamine. Examples of other aminotriazines include substituted melamines, for example, chlorinated, alkylated or phenylated melamines, deaminated melamines, for example, ammeline, ammelide and the like. Other examples of aminotriazines are 2,4,6-triethyl and triphenyl-triamino-1,3,5-triazines, 2,4,6-trihydrazino-1,3,5-triazine, and the corresponding condensed triazines such as melam and melem, 2-amino-1,3,5-triazine, 2-chloro-4,6-diamino-1,3,5-triazine, 2-phenyl-4-amino-6-hydroxyl-1,3,5-triazine and 6-methyl-2,4-diamino-1,3,5-triazine. Mixtures of aminotriazines are also included within the scope of this invention. When the particular aminotriazine employed contains less than 6 aldehyde-replaceable hydrogen atoms, the upper limit of the proportion of formaldehyde employed may be reduced. In general, it is preferred that the aminotriazine have at least two aldehyde-replaceable hydrogen atoms attached to the amido nitrogen atoms.

While formaldehyde, (or compounds engendering formaldehyde), particularly aqueous solutions of formaldehyde, is the preferred aldehyde employed for reaction with melamine or other aminotriazine, other aldehydes are included within the scope of this invention. As examples may be mentioned, aliphatic aldehydes, such as acetaldehyde, propionaldehyde, butyraldehyde, heptaldehyde, hexaldehyde and furfural; unsaturated aldehydes such as acrolein, methacrolein and crotonaldehyde; aromatic aldehydes such as benzaldehyde; and mixtures of the foregoing aldehydes. Furthermore, the ethers may be prepared from the reaction products of aminotriazines and aldehydes generally. A particular group of aminotriazine-aldehyde addition products are those prepared from aliphatic aldehydes which may be termed alkylol-aminotriazines and particularly contemplated are those alkylol-aminotriazines in which the alkylol group contains less than 7 carbon atoms. These products, or ethers thereof, may be used in making the compositions of the invention.

The compositions of the invention may be used for various purposes for which thermosetting materials are adapted. For example, these compositions may be molded into articles of various shapes or they may be used for coating materials such as wood, cloth, or other textiles, paper, glass sheets of fibers, metals, articles made from plastic materials such as those made from synthetic resins and the like, or they may be used for cementing together various materials such as those mentioned above. Another use for the compositions of the invention is their use as interlayer material in laminated glass. Of particular importance are uses wherein their transparent and thermosetting characteristics are advantageous.

The foregoing description is intended to illustrate the invention without limiting the scope thereof as set forth in the appended claims.

What is claimed is:

1. A process which comprises mixing an aqueous solution containing 100 parts by weight of a water-soluble heteropolymer consisting of 1–2 mols of vinyl acetate and 1 mol of a compound taken from the group consisting of maleic acid and maleic anhydride, with an aqueous solution containing 2–15 parts by weight of a water-soluble, fusible aldehyde-aminotriazine condensation product, said aminotriazine having at least two aldehyde-replaceable hydrogen atoms attached to the amido nitrogen atoms, drying the resultant aqueous solution and curing the dried mixture with heat to produce an insoluble, infusible product.

2. A process as in claim 1 wherein the aminotriazine is melamine.

3. A process as in claim 2 wherein the aldehyde is formaldehyde.

4. A product made by the process of claim 3.

5. A process as in claim 1 wherein the water-soluble aldehyde - aminotriazine condensation product is an alkyl ether thereof in which the alkyl groups contain from 1 to 6 carbon atoms.

6. A process as in claim 5 wherein the condensation product is a water-soluble methyl ether of methylol melamine.

7. A product made by the process of claim 1.

MASSIMO BAER.

REFERENCES CITED

The following references are of record in the file of this patent:

UNITED STATES PATENTS

| Number | Name | Date |
| --- | --- | --- |
| 2,047,398 | Voss et al. | July 14, 1938 |
| 2,227,200 | Robie | Dec. 31, 1940 |
| 2,411,590 | Powell | Nov. 26, 1946 |
| 2,469,408 | Powers et al. | May 10, 1949 |